United States Patent [19]

Kobayashi et al.

[11] Patent Number: 4,738,108

[45] Date of Patent: Apr. 19, 1988

[54] BRAKE POWER SERVO BOOSTER

[75] Inventors: Michio Kobayashi; Morihiko Shimamura, both of Saitama, Japan

[73] Assignee: Jidosha Kiki Co., Ltd., Tokyo, Japan

[21] Appl. No.: 904,806

[22] Filed: Sep. 8, 1986

Related U.S. Application Data

[63] Continuation of Ser. No. 550,415, Nov. 10, 1983, abandoned.

[30] Foreign Application Priority Data

Nov. 12, 1982 [JP] Japan ................. 57-198772

[51] Int. Cl.$^4$ ............................................. B60T 13/00
[52] U.S. Cl. ..................... 60/547.1; 60/589; 92/13.2
[58] Field of Search ............ 60/593, 547.1, 589; 92/13.1, 13.2

[56] References Cited

U.S. PATENT DOCUMENTS

| | | | |
|---|---|---|---|
| 2,272,091 | 2/1942 | Loewe | 92/13.6 |
| 4,227,371 | 10/1980 | Takeuchi | 60/547.1 |
| 4,270,355 | 6/1981 | Green | 60/593 |
| 4,307,570 | 12/1981 | Yardley | 60/547.1 |
| 4,316,529 | 2/1982 | Yanagawa et al. | 60/593 |
| 4,400,943 | 8/1983 | Belart | 60/547.1 |
| 4,423,597 | 1/1984 | Spielmann | 60/547.1 |
| 4,433,614 | 2/1984 | Takeuchi et al. | 60/547.1 |
| 4,505,114 | 3/1985 | Haar | 60/547.1 |
| 4,531,370 | 7/1985 | Hendrickson | 60/547.1 |
| 4,543,790 | 10/1985 | Coll | 60/547.1 |

FOREIGN PATENT DOCUMENTS 2250386  5/1973  Fed. Rep. of Germany ..... 60/547.1

Primary Examiner—Abraham Hershkovitz
Attorney, Agent, or Firm—Sughrue, Mion, Zinn, Macpeak & Seas

[57] ABSTRACT

A brake power servo booster in which a power piston is slidably disposed in a shell, a master cylinder is connected to the brake pedal side of the shell, an input shaft is used to actuate a valve mechanism in order to generate a pressure difference between the forward and backward sides of the power piston, an output shaft is used to connect the power piston and a piston contained in the master cylinder, and a stopper member is provided in the housing of the master cylinder for limiting the retreat position of the input shaft.

5 Claims, 5 Drawing Sheets

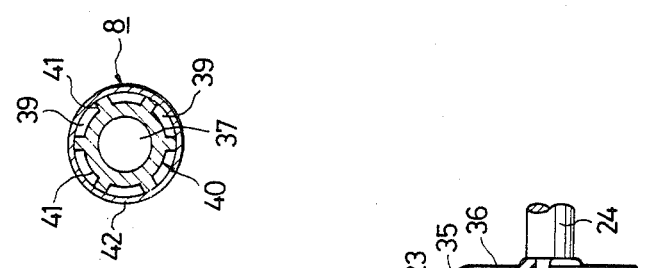
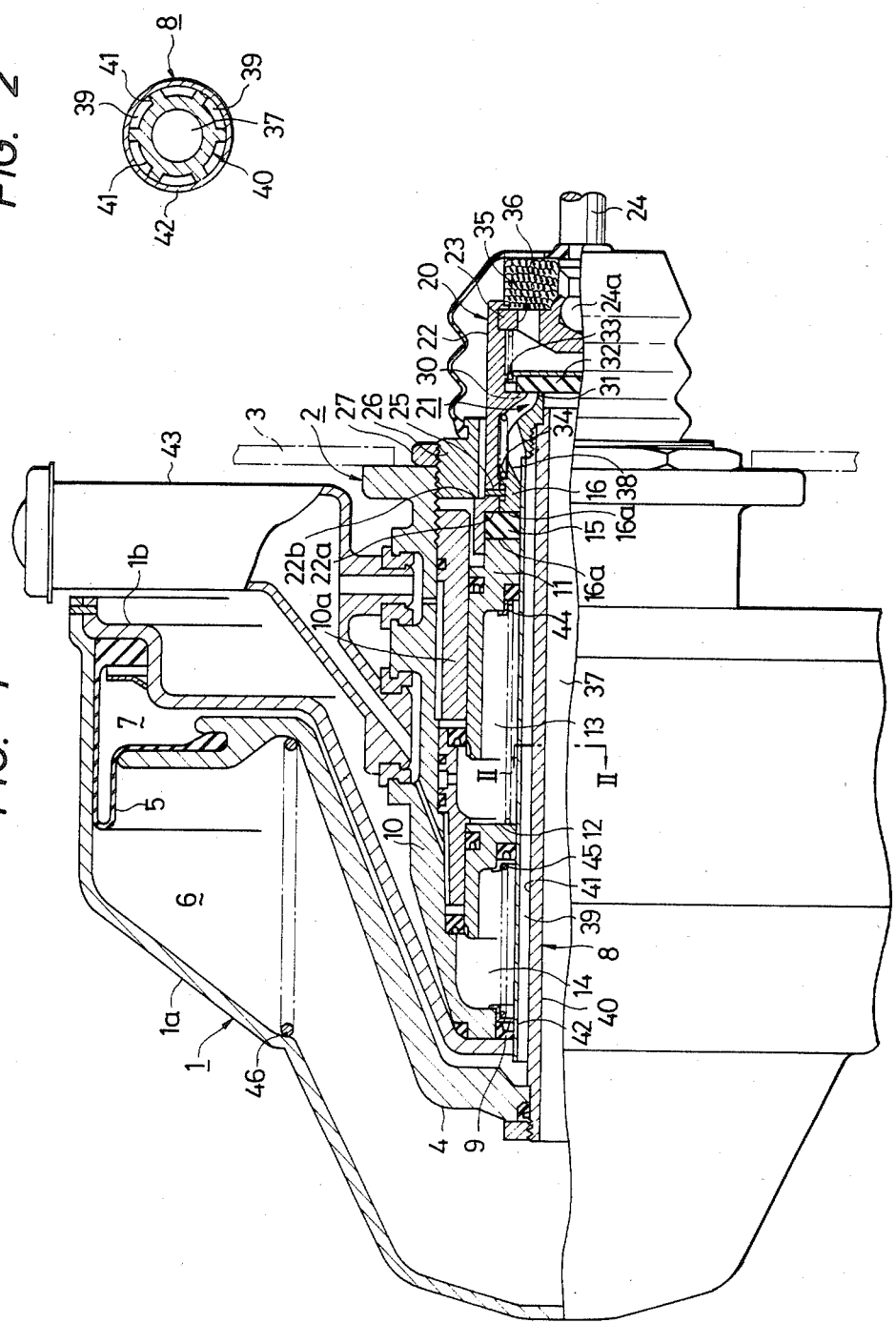

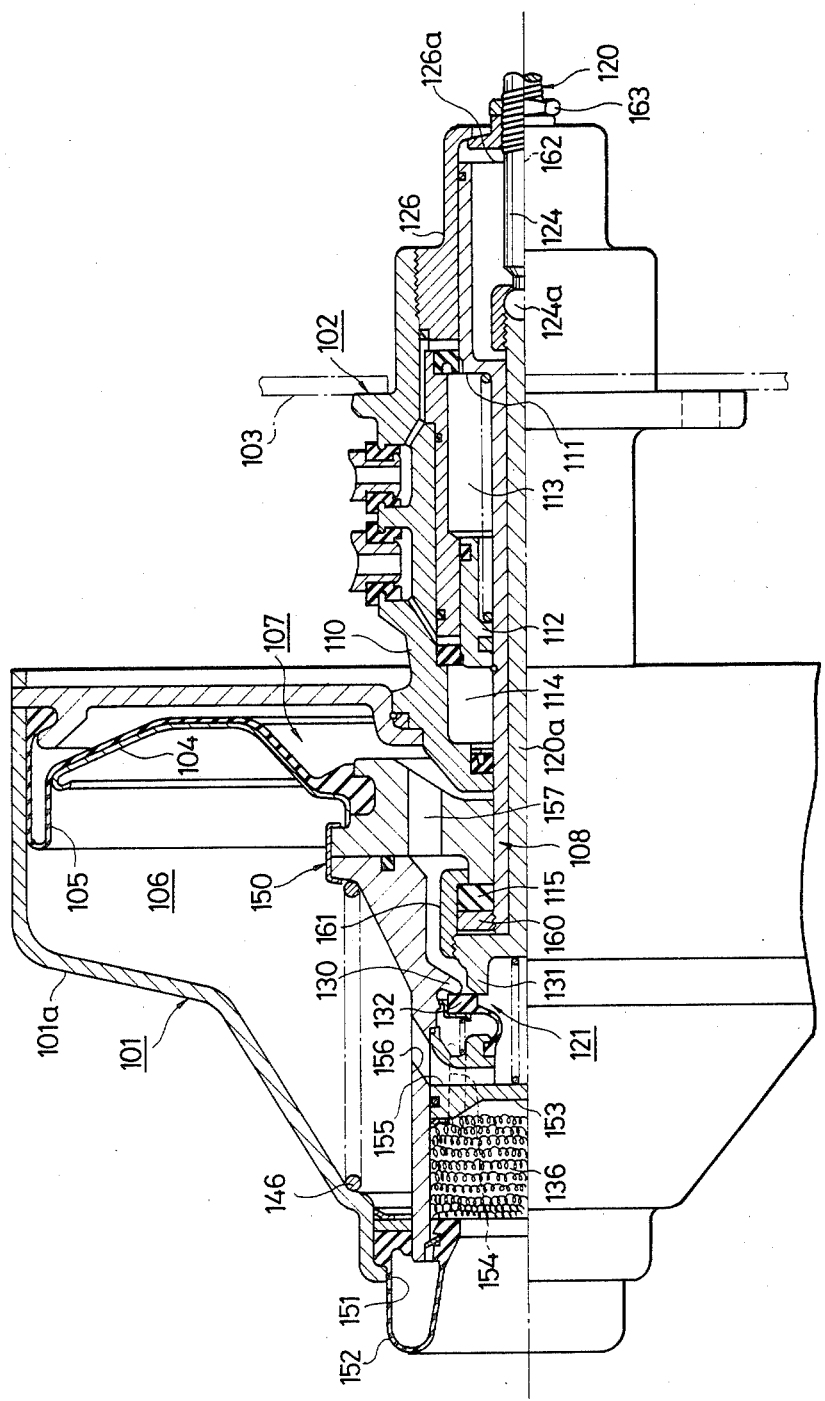

BRAKE POWER SERVO BOOSTER

This is a continuation of application Ser. No. 550,415, filed Nov. 10, 1983, now abandoned.

BACKGROUND OF THE INVENTION

The present invention relates to a brake power servo booster and particularly to a brake power servo booster in which the loss stroke of an input shaft at the beginning of the operation is reduced. A brake power servo booster of this type is arranged such that when a power piston is retracted, a wide flow path area is maintained in a valve mechanism to enable the retreating operation of the power piston to be performed quickly. During the non-actuated period of the brake power servo booster, the flow path area is made small or zero so that the flow path of the above-mentioned valve mechanism can be immediately switched over at the advancing operation of the input shaft upon the next depression of a brake pedal. Therefore, in the present invention the loss stroke of the input shaft, required before the input shaft can be advanced, can also be made small in comparison with the conventional brake power servo booster in which the above-mentioned flow path is left wide even in the non-actuated state of the brake power servo booster.

Conventionally, in order to obtain the function mentioned above in a brake power servo booster in which a master cylinder is connected to a front shell and a rear shell is connected to a car body, a stopper has been provided in the rear shell for limiting the retreat position of an input shaft so as to prevent the free retreat of the input shaft relative to a valve mechanism of the input shaft only in the non-actuated state of the brake power servo booster, thereby decreasing the loss stroke. Alternatively, a key member may be provided for preventing a valve plunger, constituting a valve mechanism, from coming off from a valve body. The key member may be slidably provided in the valve body so that the key member is made to contact with the inner surface of a rear shell in the non-actuated state to thereby prevent the free retreat of the key member relative to the valve body, and therefore prevent the free retreat of an input shaft which is interlocked with the key member through a valve plunger, so as to decrease the above-mentioned loss stroke.

In the former arrangement, however, although there is an advantage in that the stopper member, which is made to contact with the input shaft, is outside the shell so that the retreat position of the input shaft can be easily adjusted, there is also a disadvantage, in that because the stopper member is required to make contact with the input shaft in a manner such that the stopper member covers the valve body, which projects relatively far out of the rear shell, the stopper member is required to be highly rigid, resulting in an increase in weight as well as in the overall length of the brake servo booster. In the latter arrangement, in contrast to the former, although there is an advantage in that the increase in weight and in overall length can be kept to a minimum since only the improvement in the key portion is required, there is a disadvantage in that the adjustment of the retreat position of the input shaft becomes difficult because the key portion is located within the shell.

SUMMARY OF THE INVENTION

The present invention has been attained in view of the circumstances mentioned above, and particularly in consideration of the fact that in a brake power servo booster in which a master cylinder is connected to a rear shell, a housing of the master cylinder having high rigidity exists around an input shaft, and the brake power servo booster according to the present invention is arranged such that a stopper member for limiting the retreat position of the input shaft is provided in such a housing. Thus, in the present invention the increase in weight as well as in the overall length of the brake power servo booster can be kept to a minimum or avoided entirely, and the retreat position can be easily adjusted.

BRIEF DESCRIPTION OF THE DRAWINGS

FIG. 1 is a semi-cross-sectional view illustrating an embodiment of the present invention;

FIG. 2 is a cross-sectional view along the line II—II line in FIG. 1; and

FIGS. 3 to 6 are semi-cross-sectional views illustrating various embodiments of the present invention.

DETAILED DESCRIPTION OF THE INVENTION

Figure 4:
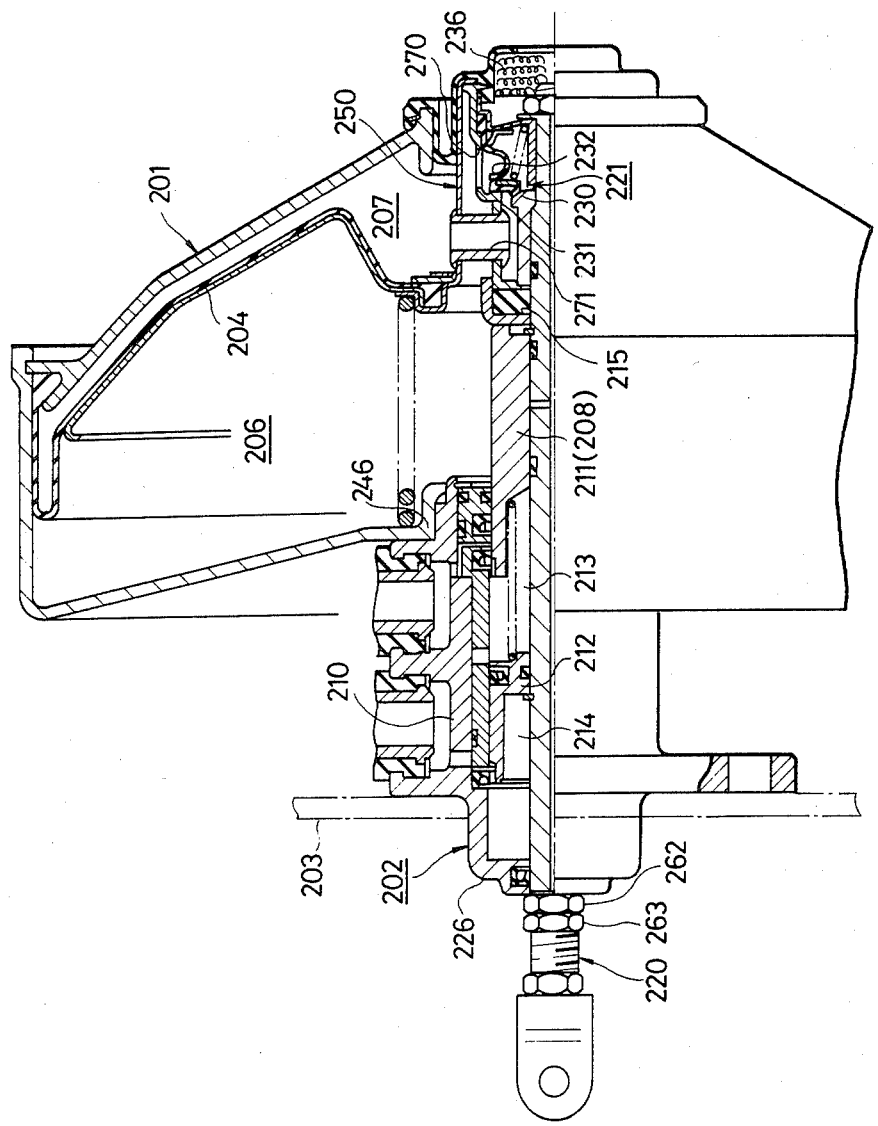

In FIG. 1, a shell 1 is constituted by a front shell 1a and a rear shell 1b. A master cylinder 2 has a forward end portion coupled with a shaft portion of the rear shell 1b, and a base portion fixed to a car body 3. A power piston 4 is provided in the shell 1, reciprocally movable in the axial direction of the shell 1. The inside of the shell 1 is partitioned by the power piston 4 and a diaphragm 5, into a constant pressure chamber 6 at the front shell 1a side and a variable pressure chamber 7 at the rear shell 1b side. A forward end of an output shaft 8 is fixedly and airtightly connected to a shaft portion of the power piston 4, and the output shaft 8 slidably passes through a housing 10 of the master cylinder 2 while maintaining liquid-tightness with a seal member 9.

In the illustrated embodiment, the above-mentioned master cylinder 2 is of the type having two systems and having provided in its housing 10 a piston 11 at the primary side and another piston 12 at the secondary side. The above-mentioned output shaft 8 slidably passes through the respective shaft portions of the pistons 11 and 12, and pressure chambers 13 and 14 are respectively formed at respective positions forward the pistons 11 and 12 at the outer periphery of the output shaft 8. A reaction disc 15 is provided such that the left end surface thereof is opposite the right end surface of the primary side piston 11. A connecting member 16 integrally attached through thread engagement to the output shaft 8, to constitute a part of the output shaft 8, is disposed such that the left end surface 16a thereof is opposite the right end surface of the reaction disc 15. The thrust of the power piston 4 is, therefore, transmitted to the piston 11 of the master cylinder 2 through the output shaft 8, the connecting member 16, and the reaction disc 15.

A valve mechanism 21 is provided at the rear side of the output shaft 8 such that the valve mechanism 21 is actuated by an input shaft 20 to generate a pressure difference between the forward and backward sides of the power piston 4. The input shaft 20 is constituted by a hollow-cylindrical member 22 with its forward end portion slidably inserted into a sleeve 10a of the master cylinder 2, a connecting member 23 fixed to the backward end portion of the hollow-cylindrical member 22, and an actuator rod 24 with its forward ball portion pivoted on a shaft portion of the connecting member 23, the stepped end surface 22a formed at the forward end portion of the hollow-cylindrical member 22 being in opposition to the right end surface of the reaction disc 15 and the backward end portion of the actuator rod 24 being interlocked with a brake pedal (not shown). A key member 25 is provided between the hollow-cylindrical member 22 and the connecting member 16 so as to connect both members to each other while allowing the relative displacement of the two. Further, in the present embodiment, a ring-like stopper member 26 is threaded to the housing 10 of the master cylinder 2 and is fixed thereto by a stopper ring 27. A stepped end surface 22b of the hollow-cylindrical member 22 constituting the input shaft 20 is made to contact with the stopper member 26 so as to limit the free retreat of the hollow-cylindrical member 22, i.e., the input shaft 20 in its non-actuated state as shown in the drawing, to thereby reduce the loss stroke of the input shaft 20 as described later.

The valve mechanism 21 is provided with a first valve seat 30 formed at the inner periphery of the hollow-cylindrical member 22, a second valve seat 31 formed at the backward end of the connecting member 16 of the output shaft 8 and inside the first valve seat 30, and a valve member 32 to be seated onto the first and second valve seats 30 and 31 from the right-hand side thereof. The valve member 32 is urged to be seated onto the first valve seat 30 by a spring 33 provided between the connecting member 23 of the input shaft 20 and the valve member 32. Another spring 34 having a spring force stronger than that of the above-mentioned spring 33 is provided between the input shaft 20 and the output shaft 8 to normally urge the second valve seat 31 away from the valve member 32.

The outer side of a seal portion of the valve member 32 and the first valve seat 30 are opened to the atmosphere through the shaft portion of the hollow-cylindrical member 22, a path 35 formed in the connecting member 23, and a filter 36 provided at the outer side of the connecting member 23. The inside of another seal portion between the valve member 32 and the second valve seat 31 is communicated with the constant pressure chamber 6 through a path 37 formed in the shaft portion of the output shaft 8. The intermediate portion between the two above-mentioned seal portions is communicated with the variable pressure chamber 7 through a path 38 formed in the connecting member 16 and a path 39 formed at the outer circumferential portion of the output shaft 8. In particular, as shown in FIG. 2, a plurality of grooves 41 are axially formed in the outer circumferential surface of a hollow shaft 40 constituting a main part of the output shaft 8, and the hollow shaft 40 is inserted into another hollow shaft 42 so that the path 39 is constituted by the grooves 41.

The two-system master cylinder 2 can be arranged similarly to conventional systems with the exceptions described above, and a particular arrangement thereof will not therefore be described here. In FIG. 1, reference numeral 43 designates a reservoir, and reference numerals 44, 45 and 46 designate return springs for holding the pistons 11 and 12 of the master cylinder 2 and the power piston 4, respectively, in their illustrated non-actuated positions.

In the arrangement as described above, when the brake pedal is depressed from the illustrated nonactuated state and the input shaft 20 is moved left, the valve member 32 initially seated onto the second valve seat 31 to cut off the communication between the constant pressure chamber 6 and the variable pressure chamber 7, and then further left displacement of the input shaft 20 causes the valve member 32 to move away from the first valve seat 30. Atmospheric air is then led into the variable pressure chamber 7 through the filter 36, the path 35, the gap between the valve member 32 and the first valve seat 30, and the paths 38 and 39, so as to generate a pressure difference between the opposite sides of the power piston 4 so that the power piston 4 is moved left against the return spring 46.

If the power piston 4 is moved left, the thrust thereof is transmitted to the primary side piston 11 of the master cylinder 2 through the output shaft 8 and the reaction disc 15 to cause the piston 11 to move left, so as to generate a braking hydraulic pressure in the pressure chamber 13, and at the same time the secondary piston 12 is also moved left to generate a braking hydraulic pressure in the pressure chamber 14. The respective braking hydraulic pressures generated in the pressure chambers 13 and 14 are supplied to a wheel cylinder (not-shown), as is well known in the prior art to thereby perform the braking operation. The brake reaction force generated in the piston 11 is transmitted to the brake pedal through the reaction disc 15 and the input shaft 20. It is noted that the reaction disc 15 functions substantially in the same manner as that used in the reaction mechanism in the conventional brake power servo booster.

Next, if the brake pedal is released from its braking state as described above, the hollow-cylindrical member 22 of the input shaft 20 is moved to the right relative to the connecting member 16 of the output shaft 8, by the spring force of the spring 34 so as to cause the valve member 32 to be seated onto the first valve seat 30 of the hollow-cylindrical member 22, to thereby cut off the communication between the variable pressure chamber 7 and the atmosphere and at the same time cause the valve member 32 to come off from the second valve seat 31. Thus, the constant pressure chamber 6 and the variable pressure chamber 7 are communicated with each other so that the pressure difference between the opposite sides of the power piston 4 is decreased and the power piston 4 is returned back into its original non-actuated state. At this time, the hollow-cylindrical member 22 is moved right relative to the connecting member 16 by an amount allowed by the key member 25 such that the distance between the valve member 32 and the second valve seat 31 becomes wide, so as to make the constant pressure chamber 6 and the variable pressure chamber 7 communicate with each other with a sufficient fluid path area.

If the input shaft 20 etc. are returned back to their original positions as the power piston 4 is moved right by the return spring 46, the end surface 22b of the hollow-cylindrical member 22 becomes in contact with the stopper member 26 so that the further right movement of the cylindrical member 22 is stopped. To the contrary, the right movement of the power piston 4 and the output shaft 8 is continued until the second valve seat 31 is made to contact with the valve member 32, so as to cause the valve member 32 to come off from the first valve seat 30 to switch over the flow path of the valve mechanism 21 so that the atmospheric air is led into the variable pressure chamber 7. Thus, when a pressure difference is generated between the opposite sides of the power piston 4 to move the power piston left, the valve mechanism 21 is switched over again so that a balanced state is at last reached in which a pressure difference corresponding to the spring force of the return spring 46 is maintained between the opposite sides of the power piston 4 and in which both the first and second valve seats 30 and 31 are in contact with the valve member 32. Thus, if the input shaft 24 is next moved to the left, the flow path is immediately switched over by the valve mechanism with no loss stroke of the input shaft.

Alternatively, the right movement of the power piston 4 may be restricted in such a manner that the power piston 4 is made to contact with the inner wall surface of the rear shell 1b immediately before the valve seat 31 of the output shaft 8 has come in contact with the valve member 32. The loss stroke of the input shaft can also be reduced in such an arrangement.

FIG. 3 shows another embodiment of the present invention which is different mainly because a valve mechanism 121 is provided forward from a master cylinder 102. In this embodiment, a substantially cylindrical valve body 150 is provided at the shaft portion of a power piston 104. A cylindrical seal member 152 folded at its axially middle portion is provided between the edge portion of the forward opening side of the valve body 150 and the opening 151 formed at the shaft portion of a front shell 101a, so that the inside of a constant pressure chamber is maintained to be airtight allowing the forward end portion of the valve body 150 to outwardly project from the opening 151.

A valve mechanism 121 for switching over the fluid circuit is provided in the valve body 150 and it is constituted by a first valve seat 130, a second valve seat 131 formed at the forward end of an input shaft 120, and a valve member 123. The outer side of a seat portion of the valve member 132 and the first valve seat 130 is communicated with the atmosphere through a plurality of paths 154 axially formed in a closure member 153 and a filter 136. The inner side of another seat portion between the valve member 132 and the second valve seat 131 is communicated with a constant pressure chamber 106 through a plurality of paths 155, radially formed in the closure member 153 and arranged so as not to communicate with the axially formed paths 154, and a path 156 formed in the valve body 150. The intermediate portion between the two above-mentioned seat portions is communicated with the variable pressure chamber 107 through a path 157 of the valve body 150.

The input shaft 120 is constituted by a first input shaft 120a and an actuator rod 124, the second valve seat 131 being provided at the forward end of the first input shaft 120a. The first input shaft 120a is slidably passed through the shaft portion of a housing 110 of the master cylinder 102, a forward end ball portion 124a of the actuator rod 124 is pivoted on the first input shaft 120a through a connecting portion formed at the backward end of the first input portion 120a, and the backward end portion of the actuator rod 124 is interlocked with a brake pedal (not-shown). An output shaft 108 for transmitting the thrust of the power piston 104 to a piston 111 of the master cylinder 102 is slidably inserted on the outer periphery of the first input shaft 120a. In the present embodiment, the output shaft 108 and the piston 111 are constituted by an integrally formed stepped hollow tube.

The forward end portion of the output shaft 108 extends into the neighborhood of the second valve seat 131 of the input shaft 120. A reaction disc 115 is provided on the rear surface of a nut member 160, threaded onto the forward end of the output shaft 108, so that the output shaft 108 can receive, through the reaction disc 115 and the nut member 160, the thrust acting on the power piston 104 and the valve body 150. A tubular connecting member 161 is threaded onto the outer periphery of the second valve seat 131 of the input shaft 120 and the nut member 160 and the reaction disc 115 are slidably contained in the tubular connecting member 161. The base portion of the connecting member 161 is inwardly bent to dispose it at the rear surface of the reaction disc 115 so that the reaction force can be transmitted from the reaction disc 115 to the brake pedal through the connecting member 161 and the input shaft 120.

A tubular stopper 126 is threaded to the housing 110 of the master cylinder 102 at its brake pedal side and the backward portion of the output shaft 108 is slidably inserted into the tubular stopper 126. A contact member 162 which is made to contact with the backward bent portion 126a of the stopper member 126, to limit the retreat of the input shaft 120, is threaded to the actuator rod 124 and is position adjustable by a stopper ring 163. The contact surface of the contact member 162 which is in contact with the bent portion 126a is made to be curved, with the center of swing of the ball portion 124a as its center, so that the axial position of the input shaft 120 cannot change even if the swing angle of the actuator rod 124 varies.

FIG. 4 shows a further embodiment of the present invention. In this embodiment, although a master cylinder 202 is connected to a shell 201 at its brake pedal side similarly to the previous embodiment, an input shaft 220 is arranged, on the contrary, to be actuated to the left in FIG. 4 when the brake pedal is depressed. Accordingly, a constant pressure chamber 206 and a variable pressure chamber 207 are disposed at the opposite positions to those in the previous embodiment such that the former is arranged at the brake pedal side of a power piston 204 and the latter at the opposite side of the power piston 204.

Similarly to the previous embodiment, a valve mechanism 221 interlocked with the input shaft 220 is provided with a second valve seat 231 provided at a valve body 250, a first valve seat 230 provided at the input shaft 220, and a valve member 232. The outer side of a seat portion of the valve member 232 and the second valve seat 231 is communicated with the constant pressure chamber 206 through a path 270. The inner side of another seat portion between the valve member 232 and the first valve seat 230 is communicated with the atmosphere through a filter 236. The intermediate portion between the two above-mentioned seat portions is communicated with the variable pressure chamber 207 through a path 271.

In the present embodiment, a stopper member 226 for restricting the free retreat, that is right movement, of the input shaft 220 in its non-actuated state is integrally formed with a housing 210 of the master cylinder 202, and a first nut 262 which is made to contact with the stopper member 226 is threaded to the input shaft 220. A second nut 263 is threaded to the input shaft 220 and is made to contact the first nut 262 to thereby fix its position on the input shaft.

Figure 5:
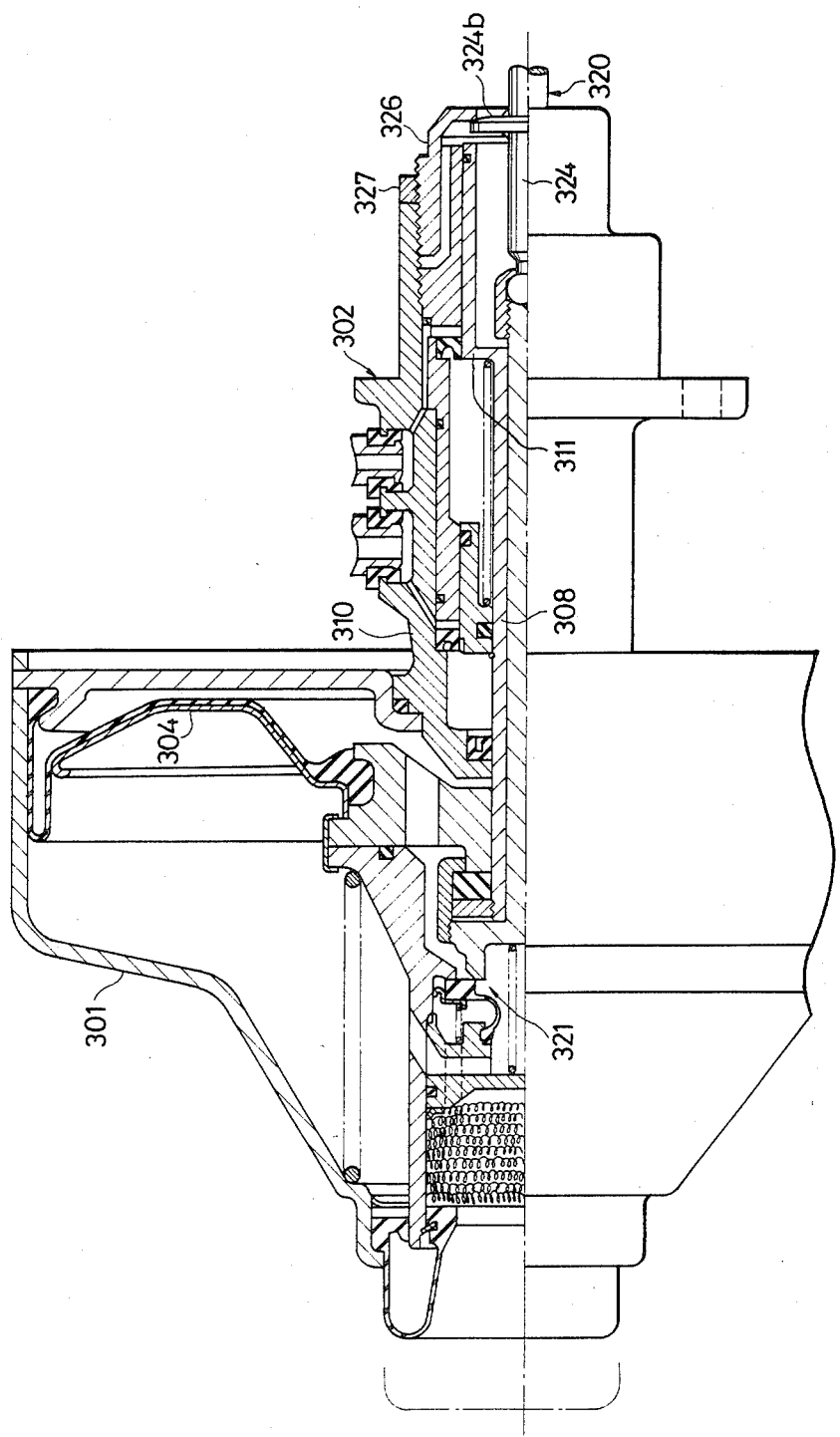

FIG. 5 shows a modification of FIG. 3 in which means for adjusting the input shaft position is changed. In particular, in the present embodiment, a part of an actuator rod 324 is caused to extend radially outwardly from a stopper ring portion 324b which is integral with the actuator rod 324. The position adjustment of an input shaft 320 is performed by a stopper member 326 threaded to a housing 310 of a master cylinder 302 and a stopper ring 327 threaded to the stopper member 326, while the stopper ring 163 is threaded onto the actuator rod 124 in the FIG. 3 embodiment.

Figure 6:
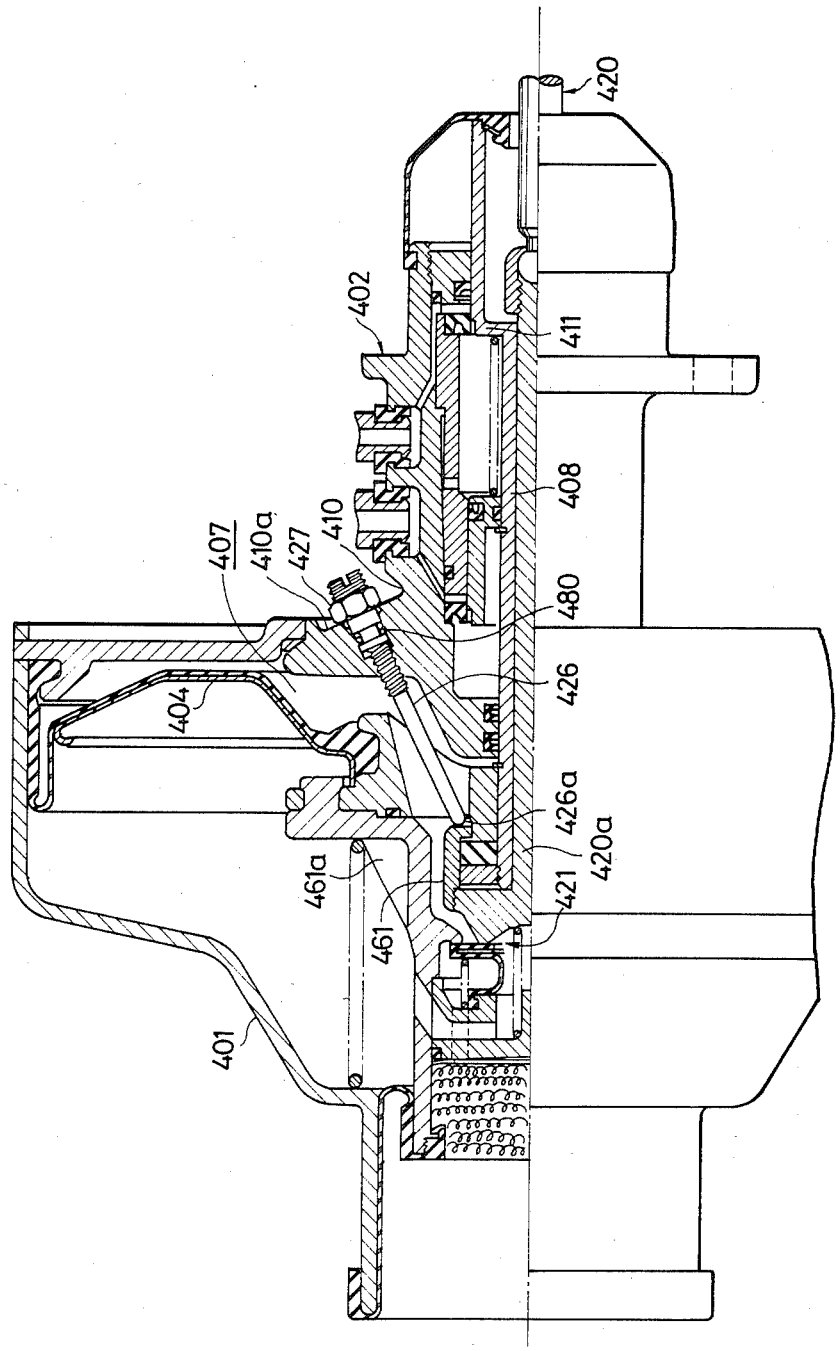

FIG. 6 shows another modification of FIG. 3 in which the position of the stopper member is changed. In this embodiment, a stopper member 426 is provided on a housing 410 of a master cylinder 402 at an end 410a of the housing opposite to the brake pedal side end of the master cylinder. An end surface 461a of a tubular connecting member 461 threaded to a first input shaft 420a is made to contact with an end surface of the stopper member 426 to thereby restrict the retreat position of an input shaft 420. The stopper member 426 may be threaded to the end surface 410a of the master cylinder so as to enable the position adjustment to be performed by a stopper ring 427, and a variable pressure chamber 407 is airtightly sealed from the atmosphere by a seal member 480.

It is apparent that the same effect as that obtained in the FIG. 1 embodiment can be obtained in each of the embodiments of FIGS. 3 to 6. In the constitution, the description of which has been omitted in each of FIGS. 3 to 6, the same or corresponding part or component is designated with a reference numeral obtained by adding 100 in FIG. 3, 200 in FIG. 4, 300 in FIG. 5 and 400 in FIG. 6 to the same numeral as that used in FIG. 1.

As discussed above, the present invention is effective and advantageous in that a stopper member is provided in a highly rigid housing of a master cylinder, so that the increase in weight and in overall length of the brake power servo booster due to the provision of the stopper member can be minimized and the retreat position of an input shaft can be easily adjusted.

We claim:

1. A brake power servo booster comprising:
   a power piston;
   a power piston return spring;
   at least two shells enclosing at least a portion of said power piston and defining a constant pressure chamber and a variable pressure chamber;
   a master cylinder for controlling the application of hydraulic pressure to a brake mechanism, said master cylinder having a housing, said shells and said chambers being exterior to said housing;
   an input shaft;
   a hollow cylindrical member integrally connected to said input shaft, said hollow cylindrical member extending internally of said master cylinder housing and being movable in a first direction for actuating said master cylinder to apply hydraulic pressure to said brake mechanism and movable in a second direction opposite said first direction to release said hydraulic pressure, said hollow cylindrical member including a first annular valve seat;
   a stopper member for limiting movement of said hollow cylindrical member in said second direction, said stopper member having a threaded portion threadedly joined to said housing of said master cylinder so as to be adjustable in said first and second directions;
   a hollow output shaft integrally connected at one end thereof to said power piston;
   a connecting member integrally connected to the other end of said output shaft and slidably disposed inside said hollow cylindrical member, said connecting member including a second annular valve seat disposed coaxially with said first annular valve seat, and said connecting member having an aperture therein communicating a space between said first and second valve seats with said variable pressure chamber;
   a valve member, said valve member closing a passage between said first and second valve members when simultaneously in abutment with both said first and second valve seats to block communication between said constant pressure chamber and said variable pressure chamber, communicating said variable pressure chamber and the atmosphere when in abutment only with said second valve seat, and communicating said constant pressure chamber and said variable pressure chamber when in abutment only with said first valve seat;
   a valve return spring for urging said valve member towards said first and second valve seats; and
   a key member provided between said connecting member and said hollow cylindrical member for allowing relative displacement between said connecting member and said hollow cylindrical member in said first and second directions within a predetermined range,
   wherein, when a brake pedal is applied to move said input shaft in said first direction to cause a braking force to be applied, said first valve seat is moved away from said valve member, communicating said variable pressure chamber and the atmosphere and thereby causing said power piston to move in said first direction, and when said brake pedal is released to move said input shaft in said second direction, said first valve seat is brought back into abutment with said valve member and said second valve seat is moved away from said valve member, communicating said constant pressure chamber and said variable pressure chamber and thereby causing said power piston to be moved in said second direction by force of said power piston return spring until said second valve seat again abuts said valve member, movement of said input shaft in said second direction being limited by said stopper member.

2. The brake power servo booster of claim 1, further comprising a spring disposed between said hollow cylindrical member and said connecting member for urging said hollow cylindrical member and said connecting member away from one another, said spring having a spring force greater than that of said valve return spring.

3. The brake power servo booster of claim 1, further comprising a stopper ring threadedly engaged with said stopper member for locking said stopper member.

4. The brake power servo booster of claim 1, further comprising a connection piece for connecting said hollow cylindrical member to said input shaft, said connection piece have an aperture formed therein communicating an interior area of said hollow cylindrical member with the atmosphere, and a filter disposed across said aperture.

5. The brake power servo booster of claim 1, wherein said key member is integrally connected to said hollow cylindrical member and has an inward portion extending radially inwardly from said hollow cylindrical member, said inward portion being received between two projections on an outward surface of said connecting member.

* * * * *